United States Patent [19]

Narabayashi et al.

[11] Patent Number: 5,392,326
[45] Date of Patent: Feb. 21, 1995

[54] BOILING WATER REACTOR

[75] Inventors: Tadashi Narabayashi; Noboru Saito; Takashi Ishitori, all of Yokohama; Kunio Shimano, Kawasaki; Yasuhiko Aida; Kiyoshi Hattori, both of Yokohama; Katsumi Yamada, Fujisawa; Nobuhiko Tanaka; Akira Nakamura, both of Yokohama; Hiroshi Miyano, Kamakura; Shigeaki Tsunoyama, Yamato; Iwao Oshima, Kawasaki; Hideo Komita, Yokohama; Takao Fujii, Ebina; Osamu Ozaki; Katsuhiko Mawatari, both of Tokyo, all of Japan

[73] Assignee: Kabushiki Kaisha Toshiba, Kawasaki, Japan

[21] Appl. No.: 20,321

[22] Filed: Feb. 19, 1993

[30] Foreign Application Priority Data

Feb. 20, 1992 [JP] Japan .................. 4-033407

[51] Int. Cl.6 ............................................. G21C 15/00
[52] U.S. Cl. .................................... 376/371; 376/372; 376/370
[58] Field of Search ................ 376/371, 372, 370; 976/DIG. 202, 195; 122/486

[56] References Cited

U.S. PATENT DOCUMENTS

| | | | |
|---|---|---|---|
| 3,020,887 | 2/1962 | Hobson et al. | 121/40 |
| 3,625,820 | 12/1971 | Gluntz | 376/372 |
| 4,423,002 | 12/1983 | Wiart et al. | 376/227 |
| 4,714,055 | 12/1987 | Sundheimer | 122/488 |
| 4,789,520 | 12/1988 | Morimoto et al. | 376/419 |
| 4,879,087 | 11/1989 | Akiyama et al. | 376/216 |
| 5,089,212 | 2/1992 | Strobel et al. | 376/237 |
| 5,200,140 | 4/1993 | Kobsa et al. | 376/227 |

FOREIGN PATENT DOCUMENTS 2-253195 10/1990 Japan.
2-253196 10/1990 Japan.
3-75593 3/1991 Japan.

*Primary Examiner*—Donald P. Walsh
*Assistant Examiner*—Meena Chelliah
*Attorney, Agent, or Firm*—Oblon, Spivak, McClelland, Maier & Neustadt

[57] ABSTRACT

A boiling water reactor comprises a reactor pressure vessel accommodated in a vertical fashion, a core disposed at a low portion in the reactor pressure vessel, a plurality of control rods to be inserted from an upper side of the core into the spaces between adjacent fuel assemblies and withdrawn therefrom upwardly, a shroud surrounding the fuel assemblies so as to define the core and having an upper end opening, a shroud head which closes the upper end opening of the shroud and through which the control rods are inserted or withdrawn, a separator standing upward from the shroud head to carry out gas-water separation of steam generated from the core, a fixing pedestal disposed above the separator, a control rod driving mechanism mounted on the fixing pedestal and adapted to drive the control rods, a drier unit including a plurality of drier elements annularly arranged along an upper inner wall surface of the reactor pressure vessel and adapted to dry the steam passing through the steam flow hole of the fixing pedestal, and a jet pump unit disposed in a space between an outer surface of the shroud and an inner wall surface of the reactor pressure vessel.

20 Claims, 20 Drawing Sheets

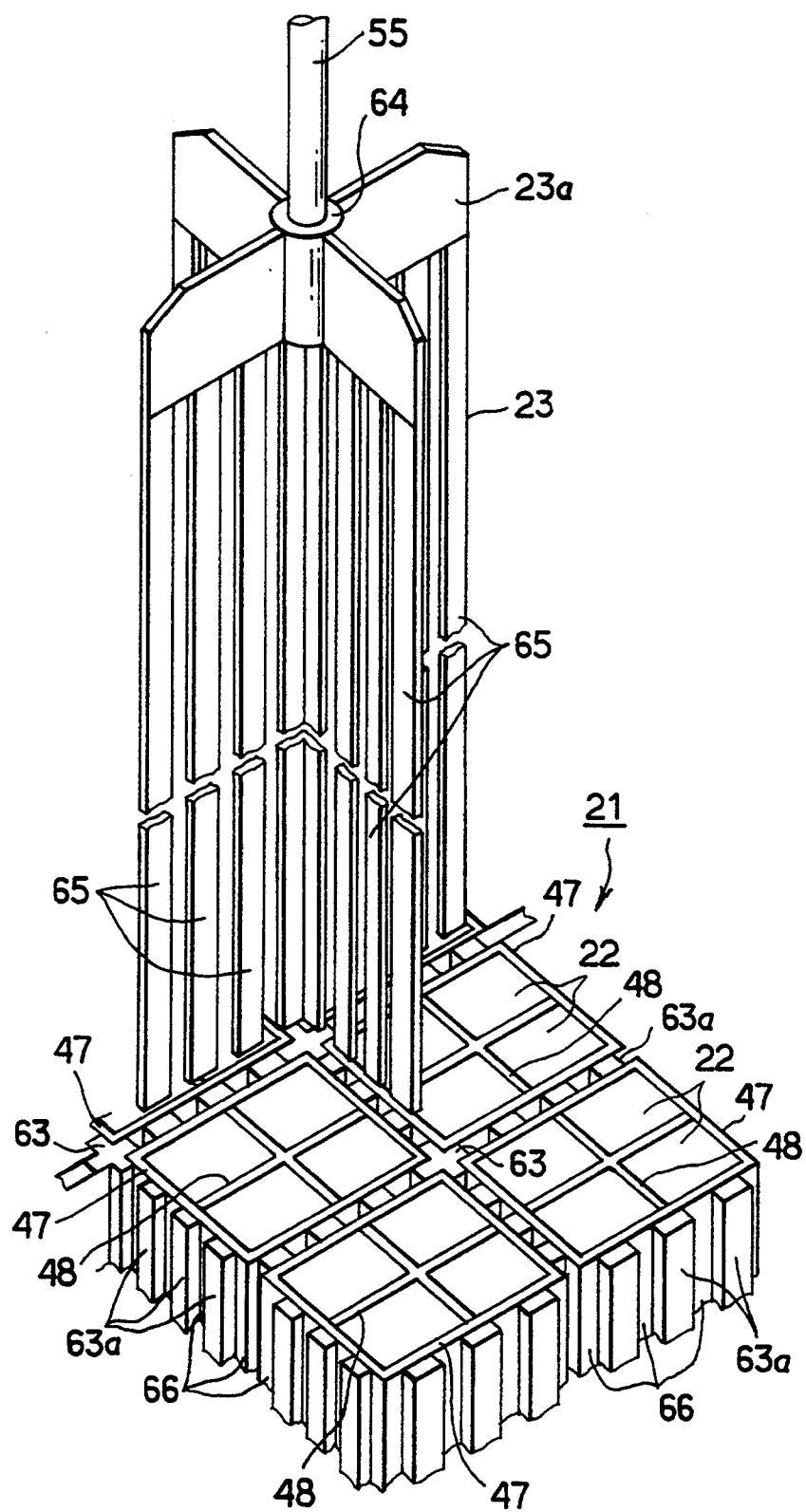
F I G. 14

BOILING WATER REACTOR

BACKGROUND OF THE INVENTION

The present invention relates to a boiling water reactor provided with a core structure, incore structural machineries and a recirculation system of a reactor for realizing a reactor capable of improving maintenace workings and operability of the reactor and remarkably reducing labour, load or the like of workers or operators for periodical inspections of the reactor.

A boiling water reactor is a reactor of the type in which slightly enriched uranium is used as a fuel, which is directly boiled in a core by utilizing water as a moderator or coolant and steam is then generated.

A boiling water reactor power plant is generally composed of a reactor system and a turbine system. The reactor system comprises a reactor primary series system including a reactor body having a core fuel, an incore structure and a pressure vessel, a recirculation system, a control rod driving system and a main steam system and also comprises a reactor auxiliary system including an emergency core cooling system.

In a known technology, there has been proposed an improved boiling water reactor in which an internal pump system is utilized for a coolant recirculation system instead of an incore jet pump system. Such a boiling water reactor is shown for example in FIG. 20.

Referring to FIG. 20, a core 2 is disposed at a portion slightly lower from a central portion in the reactor pressure vessel 1. A plurality of control rod guide tubes 3 are arranged below the core 2, and the core 2 is composed of a shroud 4 having an upper opening closed by a shroud head 5. Stand pipes 7 of a centrifugal separator 6 stand from the shroud head 5 and six rectangular flat type driers 8 are mounted on the centrifugal separator 6.

A control rod driving mechanism 9 for driving cross-blade type control rods under guidance of inner surfaces of the control rod guide tubes 3 is disposed at a lower portion of the reactor pressure vessel 1. A plurality of internal pumps 10 are mounted to a bottom portion of the reactor pressure vessel 1 at portions between an inside of the reactor pressure vessel 1 and an outside of the shroud 4.

The core is composed of a plurality of fuel assemblies arranged in a lattice structure, and in each of fuel assemblies, fuel rods in 8-row×8-line arrangement are supported by upper and lower tie plates and spacers. An entire structure of the fuel assemblies is surrounded by a channel box. Each of the fuel rods is formed by baking a slightly enriched uranium in the shape of a pellet which is then charged into a fuel clad.

The control rod has a cross shape and acts to control a chain reaction in a fission, and the control rod is charged or inserted into the lattice arrangement of the fuel assembly from the lower side of the reactor pressure vessel 1, and the insertion or withdrawal of the control rod from the fuel assembly is performed by means of the control rod driving mechanism 9 connected to the control rod.

In the core 2, the lower portions of the fuel assemblies are supported by a core support plate 11, the upper portions thereof are supported by an upper grid plate 12, and the entire structure thereof is surrounded by the shroud 4. A main steam pipe 13 is connected to an upper side wall portion of the reactor pressure vessel 1, and the steam dried by the driers 8 is transferred to a turbine through the main steam pipe 13. A water supply pipe 14 is also connected to the side wall of the reactor pressure vessel 1 for supplying the coolant into the reactor pressure vessel 1, and the coolant fed thereinto is forcibly circulated by the internal pumps 10.

The boiled two-phase, water and steam, flow from the core 2 is separated by the centrifugal separator 6 into water and steam and the water content in the separated steam is further removed by the driers 8.

The reactor pressure vessel 1 is fixedly mounted on a pedestal 16 through a supporting skirt 15. The attaching or detaching operation of the contol rod driving mechanism 9 is carried out in the pedestal by means of a control rod handling machine 17. An upper end opening of the pressure vessel 1 is pressure-tightly closed by an upper cover 18 and the entire structure of the reactor pressure vessel 1 is accommodated in the reactor containment vessel 19.

With the nuclear power plant including the boiling water reactor of the structure described above, at a time of maintenance operation for the periodical inspection of the power plant, operators or workers enter the lower portion of the reactor pressure vessel 1 for removing the internal pumps 10 and the control rod driving mechanism 9. Although the internal pumps 10 are removed by a removing apparatus, the operators must perform preliminary removing work before the operation of the removing apparatus.

During such preliminary work removing, however, there is a fear that the water coolant will down to the workers from the reactor pressure vessel 1. Under this dangerous environment, the long time working in such place of relatively high possibility of exposure of radiation dose is not desired for the workers in their physical and mental conditions. These may be also referred to for the inspection working or exchanging working of the control rod driving mechanism 9 and incore neutron detectors.

One object of the present invention is to completely eliminate such dangerous maintenance working under the reactor pressure vessel 1.

In another point of view, it is necessary for the operator to pay his highest attention to a water level in the core during the running operation of the reactor. In an ordinary operation, the water level in the core is automatically maintained to a predetermined level by an automatic controlling, and the control of the water level can be usually done by monitoring a display on a control board in a central operation room.

However, in a case of a turbine trip or in a case where the coolant in the core changes into steam and then flows out of the core by an operation of safety valve for a main steam escape after the closing of a main steam isolation valve, the water level in the core lowers downward, and at this moment, a water supply pump, which is driven in isolation by a steam turbine, is operated to thereby start the water supply, but if this starting of the water supply is delayed, the water level in the core further lowers and an emergency core water supply system starts to operate.

The emergency core water supply system operates itself automatically under a preliminarily designed safety control mode of a safety system, but such operation gives feel of strain or pressure to the operaters. On the contrary, when the core water level rises during the operation of the reactor by any accident of, for example, a water level setter, water flows towards the turbine, which may result in damage to the turbine blades.

As described, a transition phenomenon in which undesired water level change is caused gives mental strain to the operators, so that a second object of the present invention is to realize a boiling water reactor having a wide allowable range against the change of the core water level.

SUMMARY OF THE INVENTION

An object of the present invention is to substantially eliminate defects or drawbacks encountered in the prior art and to provide a boiling water reactor having a structure capable of handling control rods from an upper side of a reactor pressure vessel for eliminating workings of operators at a portion below a reactor pressure vessel in a reactor building.

Another object of the present invention is to provide a boiling water reactor having a reduced vertical height capable of realizing an installation on an instable place such as on a ship or a portion being liably suffered from an earthquake.

These and other objects can be achieved according to the present invention by providing a boiling water reactor comprising, a reactor pressure vessel accommodated in a reactor containment vessel in a vertical fashion, a core disposed at a low portion in the reactor pressure vessel, the core being composed of a plurality of fuel assemblies arranged with spaces from each other, a plurality of control rods to be inserted from an upper side of the core into the spaces between the fuel assemblies and withdrawn therefrom upwardly, a shroud surrounding the fuel assemblies so as to define the core and having an upper end opening, a shroud head which closes the upper end opening of the shroud and through which the control rods are inserted or withdrawn, separator means standing upward from the shroud head to carry out Gas-water separation of steam Generated from the core, a fixing pedestal disposed above the separator means and provided with a steam flow hole through which steam separated by the separator means passes, a control rod driving mechanism mounted on the fixing pedestal and adapted to drive the control rods, a drier means arranged along an upper inner wall surface of the reactor pressure vessel and adapted to dry the steam passing through the steam flow hole of the fixing pedestal, and a jet pump means disposed in a space between an outer surface of the shroud and an inner wall surface of the reactor pressure vessel.

In preferred embodiments, the drier means comprises a plurality of drier elements arranged annularly along the upper inner wall surface of the reactor pressure vessel, drain receiving vessels disposed at lower end portions of the drier elements and drain tubes extending downward from the drain receiving vessels. The drier element is composed of a metal plate formed with a number of punched holes.

The control rod driving mechanism is provided with a drive means composed of electromagnetic coils or an electromagnetically driven motor.

The separator means comprises a plurality of tube like cylindrical bodies standing upward from the shroud head, a plurality of cross-shaped control rod guide tubes to be inserted into a space between adjacent fuel assemblies and a support plate for supporting the cylindrical bodies in vertical attitude.

Each of the control rods has a vertical length substantially equal to a vertical length of the core and a vertically moving length of a control rod driving shaft is substantially equal to the vertical length of the core.

The jet pump means comprises a plurality of jet pumps arranged with equal spaces from each other and annularly along the inner wall surface of the reactor pressure vessel. The jet pump comprises first and second stage nozzles, first and second stage throats and a diffuser connected to the second stage throat. The jet pump means is driven by a plurality of jet pump driving pumps or a plurality of steam injectors.

The jet pump means is operated so that a flow rate ratio of a driving water with respect to a driven water is at least more than 6.

According to the present invention of the structures described above, since the control rod driving mechanism is disposed at a portion above the reactor core and the control rods are handled from the upper side of the core, any piping means or machineries for the control rod driving are not positioned below the core. Accordingly, the operators or workers can be made free from the working at a portion below the reactor pressure vessel and the entire vertical height of the reactor containment vessel, i.e. reactor building, can be reduced. Furthermore, the core is positioned at a lower portion in comparison with a conventional arrangement, so that a space in which relatively long separators or other means are arranged can be ensured above the core. The location of the long separator can ensure wide allowance with respect to a water level change in the reactor pressure vessel.

Still furthermore, since the control rod driving mechanism is disposed at the upper portion of the reactor pressure vessel, so that the control rod driving mechanism and associated members or elements can be entirely taken out from the reactor pressure vessel at a periodical inspection time, thus enabling easy maintenance.

The natures and features of the boiling water reactor according to the present invention will be made further clear hereunder by the following description with reference to the accompanying drawings.

BRIEF DESCRIPTION OF THE DRAWINGS

In the accompanying drawings:

FIG. 14 is a perspective view for showing a state in which a control rod is inserted into a core of FIG. 1;

DESCRIPTION OF THE PREFERRED EMBODIMENTS

One embodiment of a boiling water reactor according to the present invention will be described hereunder in conjunction with FIGS. 1 to 17.

Figure 1:
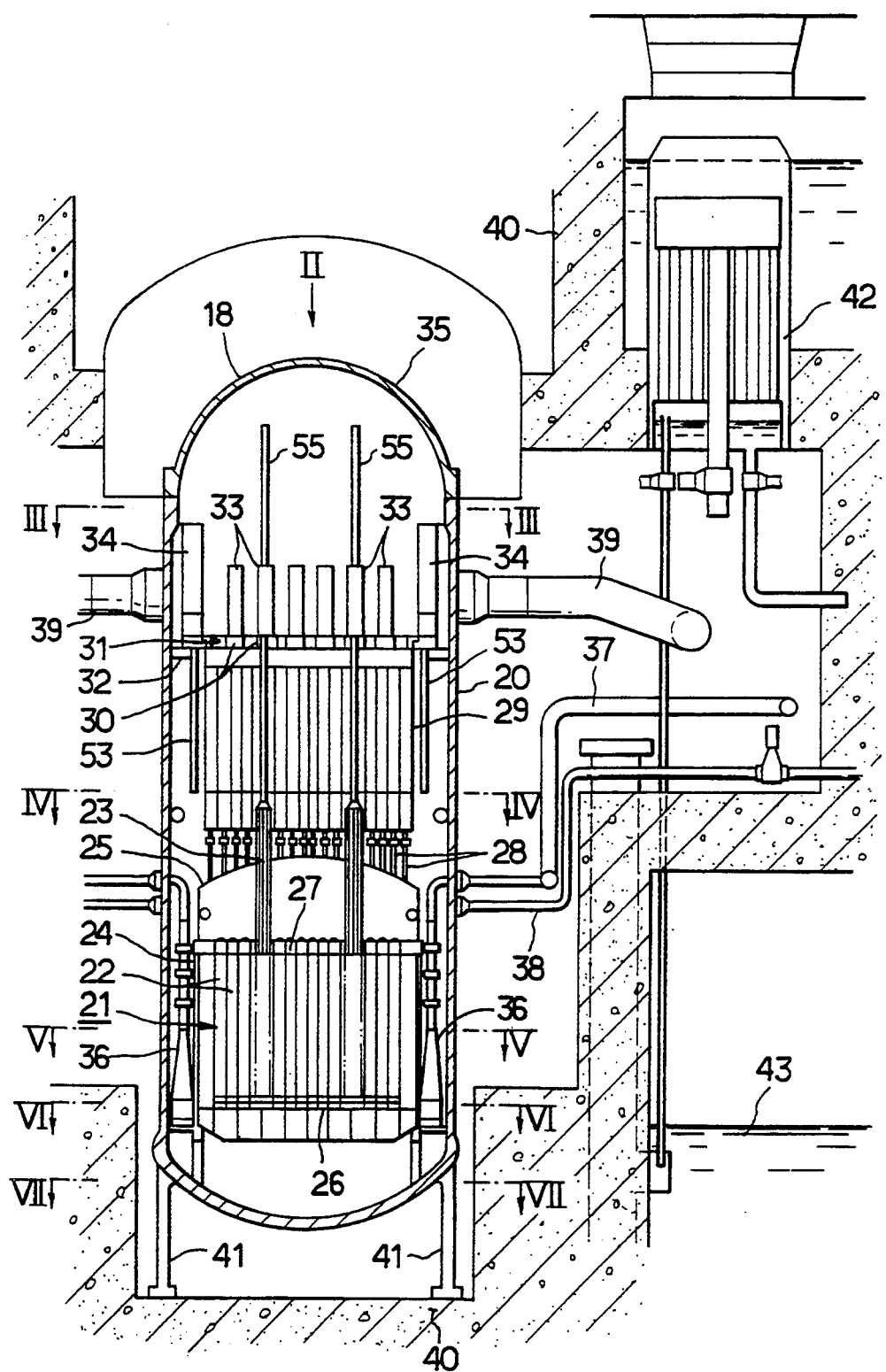
FIG. 1 is a schematic elevation of a boiling water reactor having a structure according to the present invention.

Referring to FIG. 1, a reactor pressure vessel 20 is installed in a vertical fashion and a core 21 is arranged at a lower portion in the pressure vessel 20. In the core 21, a plurality of fuel assemblies 22 are arranged in lattice so that control rods 23 are inserted into or withdrawn from the core between the respective fuel assemblies 22.

The outer periphery of the fuel assemblies 22 in the lattice arrangement are surrounded by a shroud 24 having an upper opening to which a shroud head 25 is mounted. The shroud 24 supports a core support plate 26 and an upper grid plate 27 and surrounds the entire structure of the fuel assemblies 22 to constitute the core 21. The core support plate 26 supports the lower end of the entire structure of the fuel assemblies 22 and the upper grid plate 27 supports the upper end thereof.

A plurality of stand pipes 28 stand upward from the shroud head 25 and a plurality of separators 29 are connected to the stand pipes 28. A pedestal 31 for fixing the control rod driving mechanism is disposed above the separators 29 through a support member 32 and the fixing pedestal 31 is provided with a number of steam passing holes 30. The support member 32 is welded to an inner wall surface of the reactor pressure vessel 20.

An upper control rod driving mechanism 33 for driving the control rods 23 from the upper side is mounted on the control rod driving mechanism fixing pedestal 31, and an annular drier means 34 is mounted on the fixing pedestal along its outer periphery along the inner wall surface of the reactor pressure vessel 20. The drier means 34 comprises a plurality of drier elements 51, each in shape of a short strip, which are annularly arranged along the inner wall surface of the reactor pressure vessel 20.

The reactor pressure vessel 20 has an upper opening closed pressure-tightly by an upper flange 35. A plurality of jet pumps 36 are arranged between the shroud 24 and a lower inner wall surface of the reactor pressure vessel 20 and the jet pumps 36 are connected to coolant supply pipes 37 mounted to the side of the reactor pressure vessel 20. A plurality of water supply pipes adapted to control the water level in the core are also mounted to the side of the reactor pressure vessel in parallel with the coolant supply pipes 37.

Main steam pipes 39 are connected to the upper side wall of the reactor pressure vessel 20 for feeding the steam dried by the annular drier means 34 to the steam turbine.

The reactor pressure vessel 20 of the characters or structure described above is accommodated in a predetermined position of a reactor containment vessel 40. In FIG. 1, reference numerals 41, 42 and 43 denote support legs supporting the reactor pressure vessel 20 at its bottom portion, a drywell cooling device and a pressure suppression pool, respectively.

Figure 2:
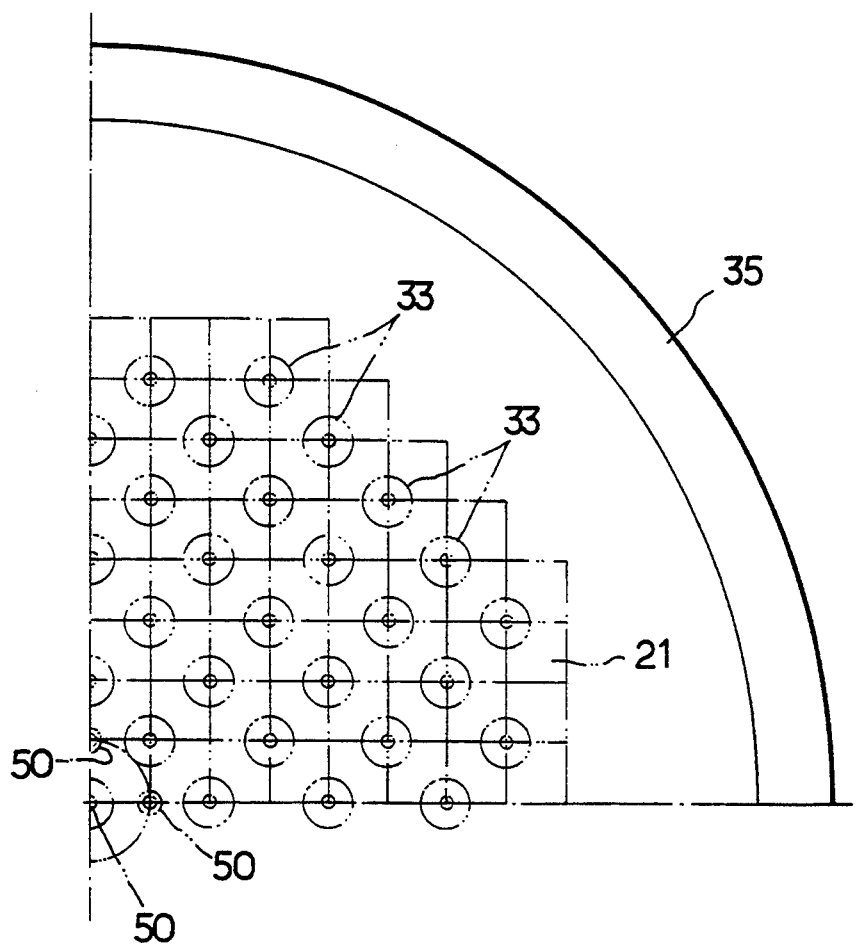
FIG. 2 is a perspective view as viewed from an arrowed direction II in FIG. 1 and only a quater thereof is shown.

FIG. 2 is a perspective view as viewed from an arrowed direction II in FIG. 1 and only a quarter thereof is shown. It is apparent from FIG. 2, though not shown in FIG. 1, that one cable protecting tube 50 is air-tightly attached to substantially the central portion of the upper cover 35 and four cable protecting tubes 50 are also air-tightly attached to the outer portions thereof. These cable protecting tubes 50 are utilized for accommodating several tens of cables, in several bundles, through which current is conducted to the upper control rod driving mechanism 33 and for accommodating cables for incore neutron dectectors.

These cables are for wires for electric power or electric signals, and a plurality of wires in a bundle are accommodated in each of the cable protecting tubes 50. These tubes 50 penetrate vertically and air-tightly the upper cover 35 of the reactor pressure vessel 20 and the extreme outer ends thereof extend outside the reactor pressure vessel 20.

Figure 3:
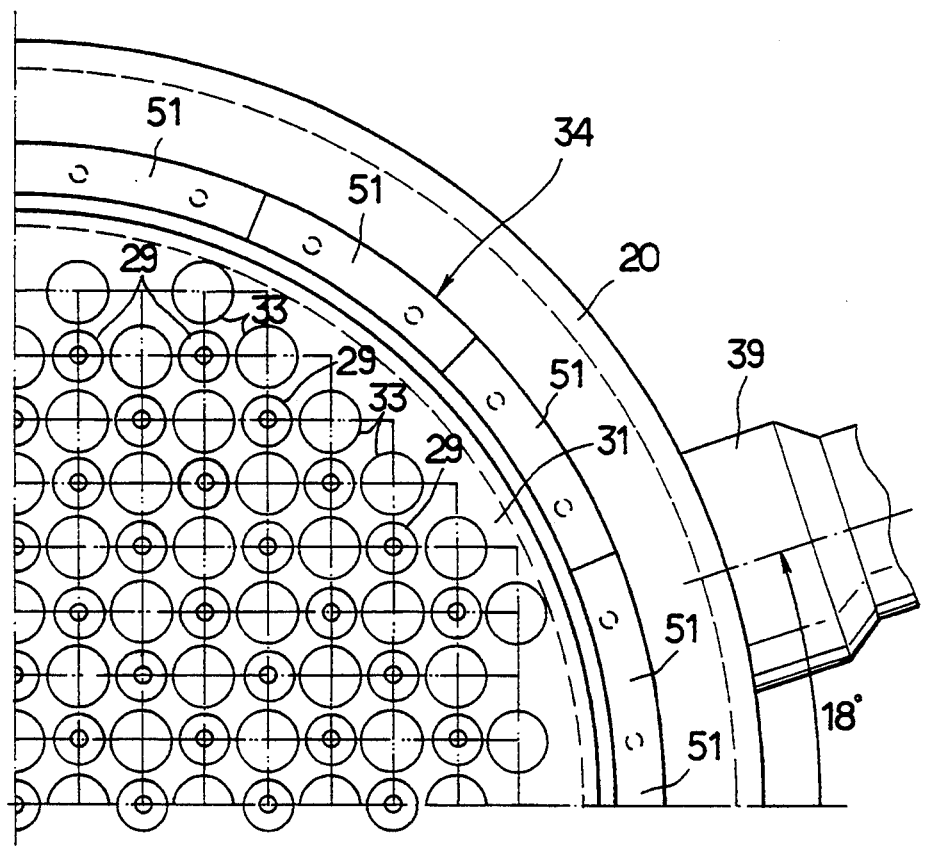
FIG. 3 is a cross sectional view taken along the line III—III in FIG. 1 and only a quater thereof is shown.
Figure 10:
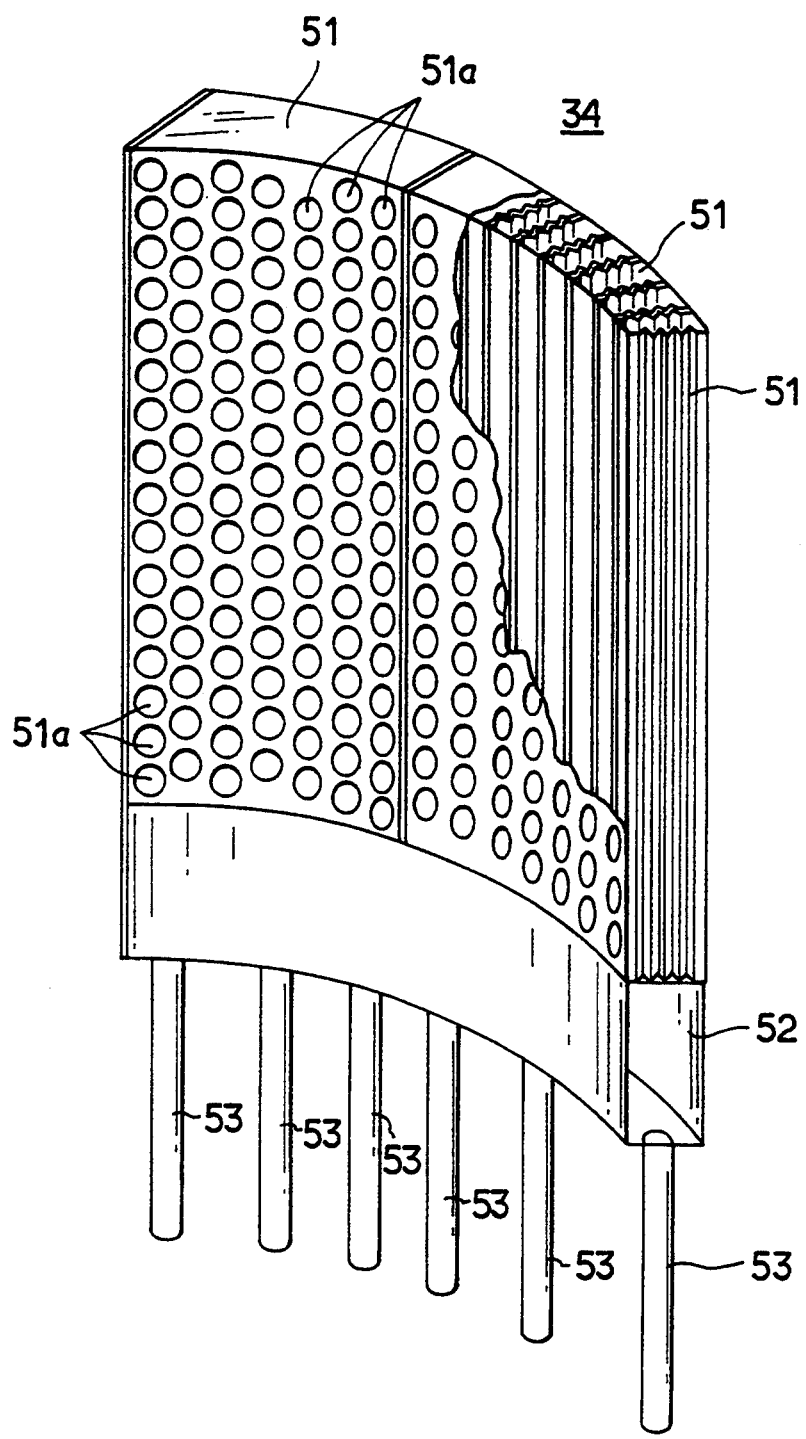
FIG. 10 is a partial sectional view of a thin drier means shown in FIG. 1.

FIG. 3 is a cross sectional view taken along the line III—III in FIG. 1, but merely a quarter thereof is shown for the sake of convenience. Referring to FIG. 3, an angle of attachment of the main steam pipe 39 is 18° with respect to the center of the axial center of the reactor pressure vessel 20. The annular drier means 34, which is composed of a plurality of drier elements 51 each in a short strip shape, and arranged annularly along the inner wall surface of the reactor pressure vessel 31, is mounted on the control rod driving mechanism fixing pedestal 31. It will be apparent from FIG. 3 that the upper control rod driving mechanism 33 and the separators 29 are alternately arranged in lattice structures on the fixing pedestal 31. The detailed structure of the drier means 34 is shown in FIG. 10, which will be described hereinlater.

Figure 4:
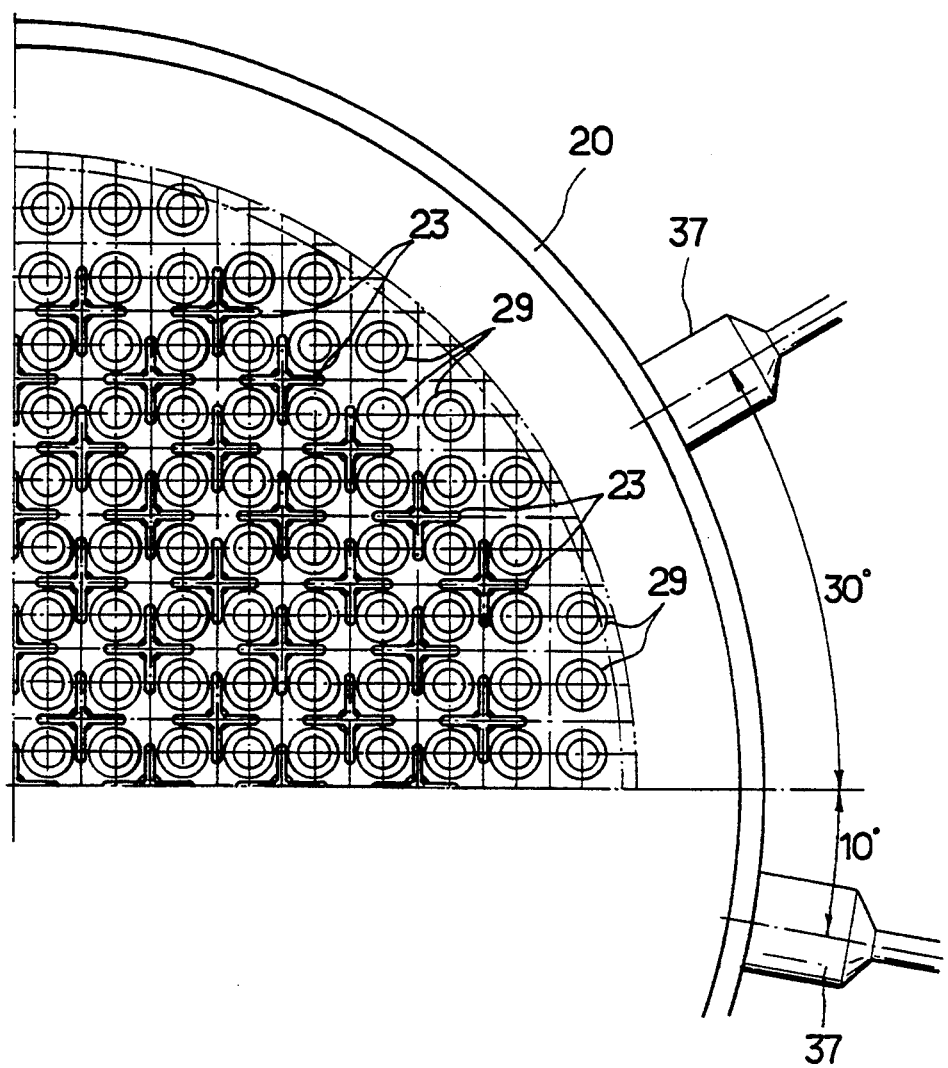
FIG. 4 is a cross sectional view taken along the line IV—IV in FIG. 1 and only a quater thereof is shown.

FIG. 4 is a cross sectional view taken along the line IV—IV in FIG. 1, but merely a quarter thereof is shown for the sake of convenience. As shown in FIG. 4, the coolant supply pipe 37 is attached to the reactor pressure vessel 20 with an angle of 30° with respect to the horizontal direction, and the control rods 23 are arranged between the separators 29, which will be described hereinlater with reference to FIG. 12.

Figure 5A:
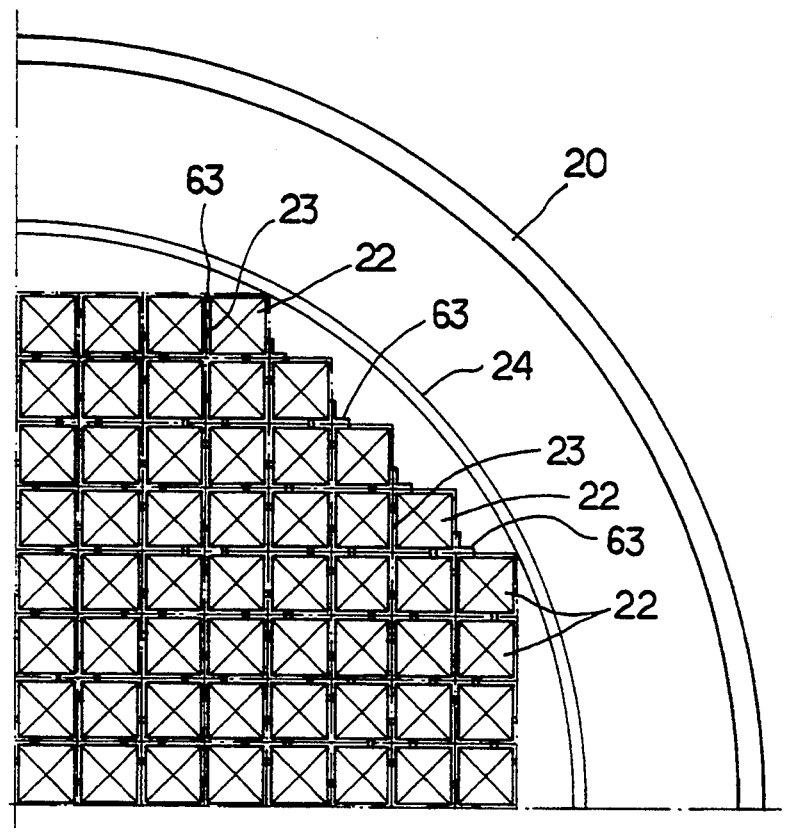
FIG. 5A is a cross sectional view taken along the line V—V in FIG. 1 and only a quater thereof is shown.
Figure 5B:
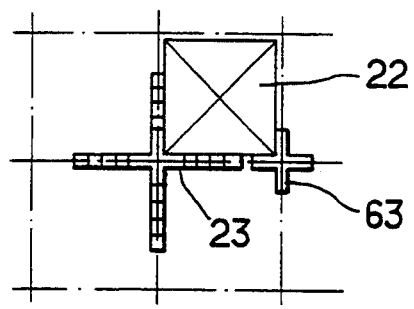
FIG. 5B shows one section of FIG. 5A in an enlarged scale.

FIG. 5A is a cross sectional view taken along the line V—V in FIG. 1, but merely a quarter thereof is shown for the sake of convenience and FIG. 5B is one section of FIG. 5A in an enlarged scale. From FIGS. 5A and 5B the arrangement of the fuel assemblies 22 in the core 21 is apparent, and also apparent is an inserted condition of a guide pad 63 inserted into a space between adjacent two fuel assemblies 22 for maintaining a space between a channel box and the control rod 23. The control rods 23, each being enlarged, are utilized for the purpose of reducing numbers of the control rod driving mechanisms and the amount of fuel because short and enlarged fuel assemblies 22 have been developed.

Figure 20:
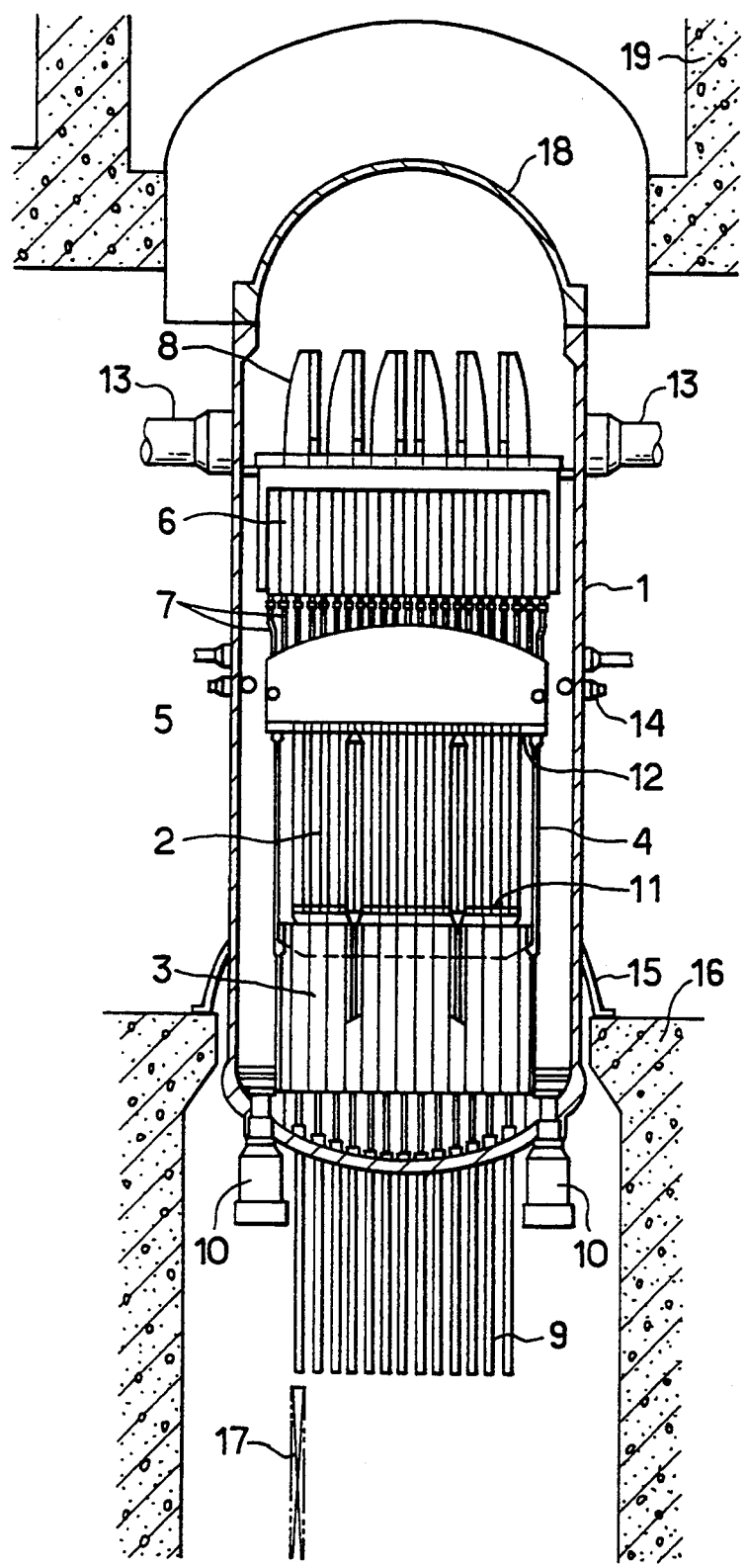
FIG. 20 is an elevational section of a reactor of a conventional structure.

That is, in comparison of a large-sized T-shape lattice core 21 having each side a length twice that of a conventional fuel rod with a conventional C-shape lattice core 2 of FIG. 20, the numbers of the fuel rods and the control rod driving mechanisms are reduced in proportion to the provision of the large-sized fuel rods, thus reducing the processes needed for the periodical inspection of the reactor and hence being advantageous for the operators or workers who work in the reactor. It is of course noted that the present invention is not limited to the T-shape lattice core and applicable to the conventional core or to the fuel rods having other sizes.

Figure 6:
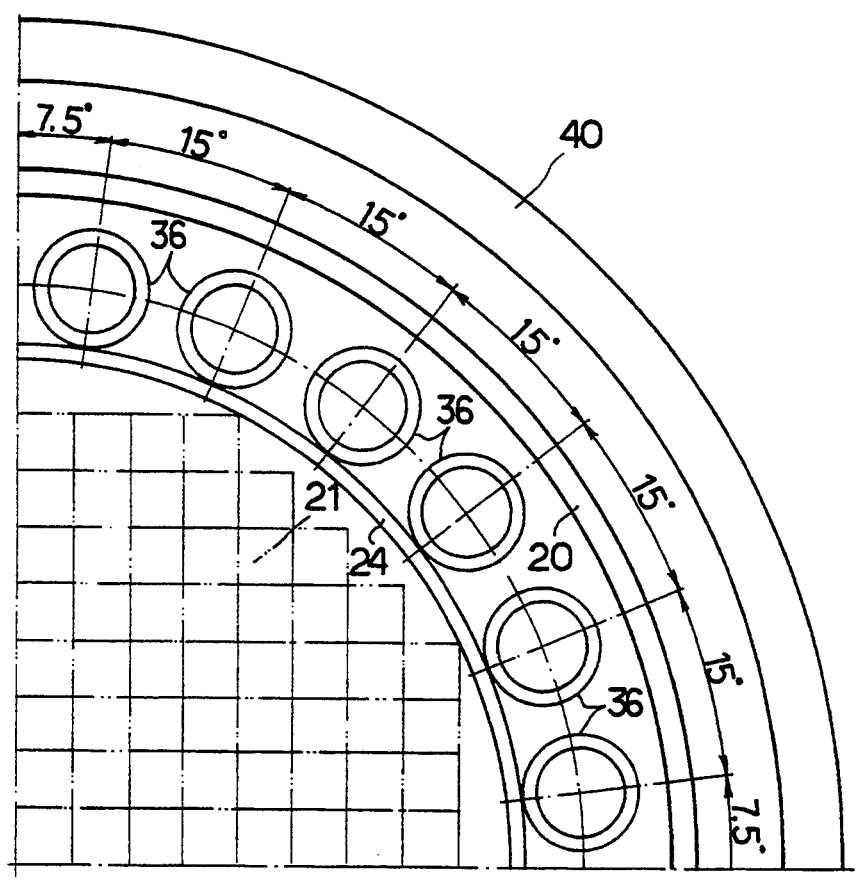
FIG. 6 is a cross sectional view taken along the line VI—VI in FIG. 1 and only a quater thereof is shown.
Figure 15:
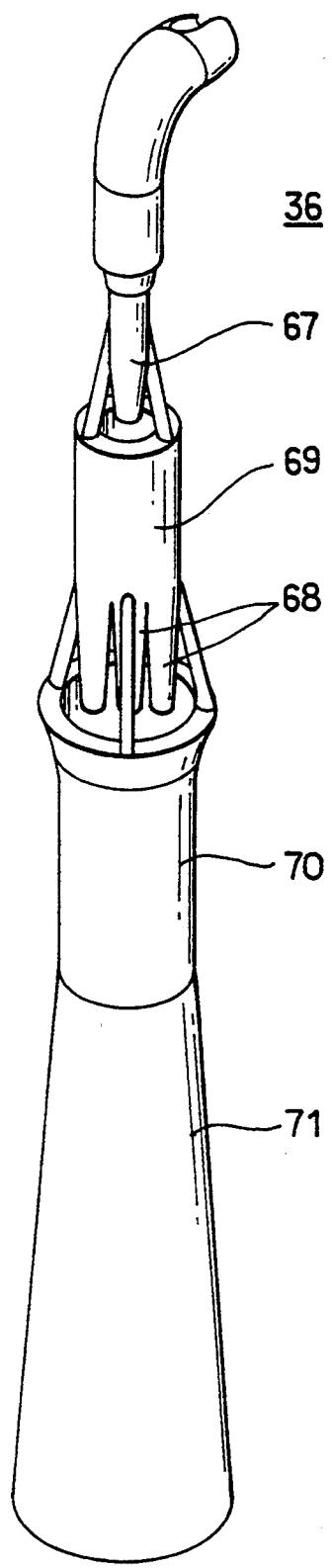
FIG. 15 is a perspective view of one jet pump shown in FIG. 1.

FIG. 6 is a cross sectional view taken along the line VI—VI in FIG. 1, but merely a quarter thereof is shown for the sake of convenience. It is apparant from FIG. 6 that twenty-four jet pumps 36 are regularly arranged with angles of 15° in the reactor pressure vessel 20 along the inner peripheral wall thereof. Each of the jet pumps 36 includes a two-staged driving water nozzle for making the flow rate ratio of the driving water with respect to a driven water greater than 6. The detail of the jet pump 36 is shown in FIG. 15. These jet pumps 36 are driven by a plurality of jet pump driving pumps or steam injectors.

Figure 7:
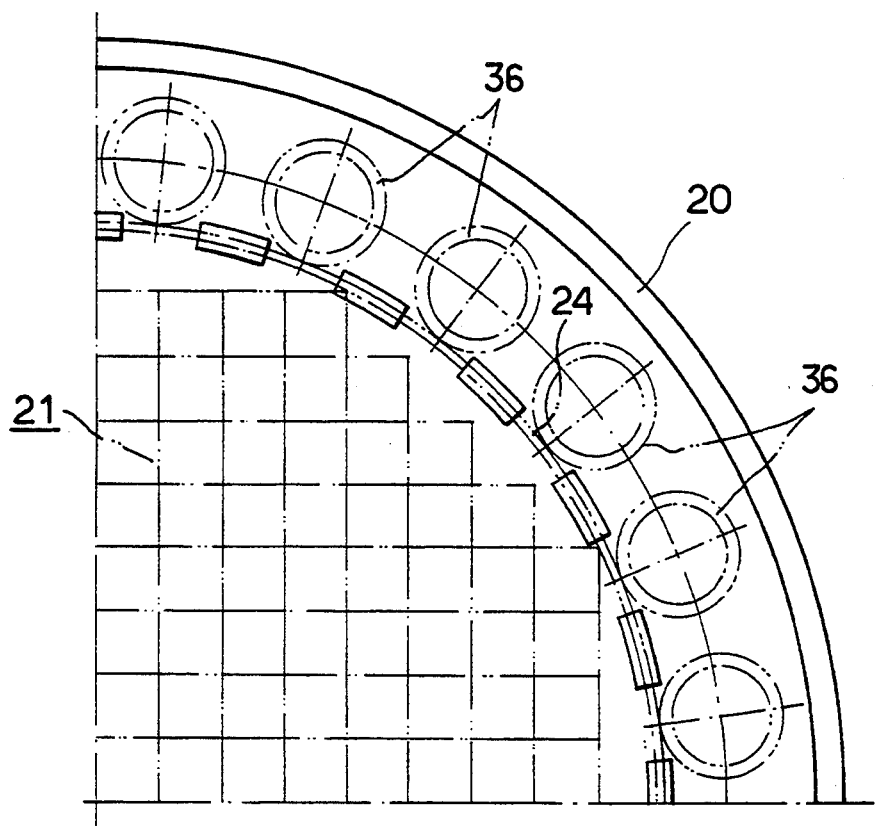
FIG. 7 is a cross sectional view taken along the line VII—VII in FIG. 1 and only a quater thereof is shown.

FIG. 7 is a cross sectional view taken along the line VII—VII, but merely a quarter thereof is shown, and shows an arrangement of the jet pumps 36, the shroud 24 and the core 21.

Figure 8:
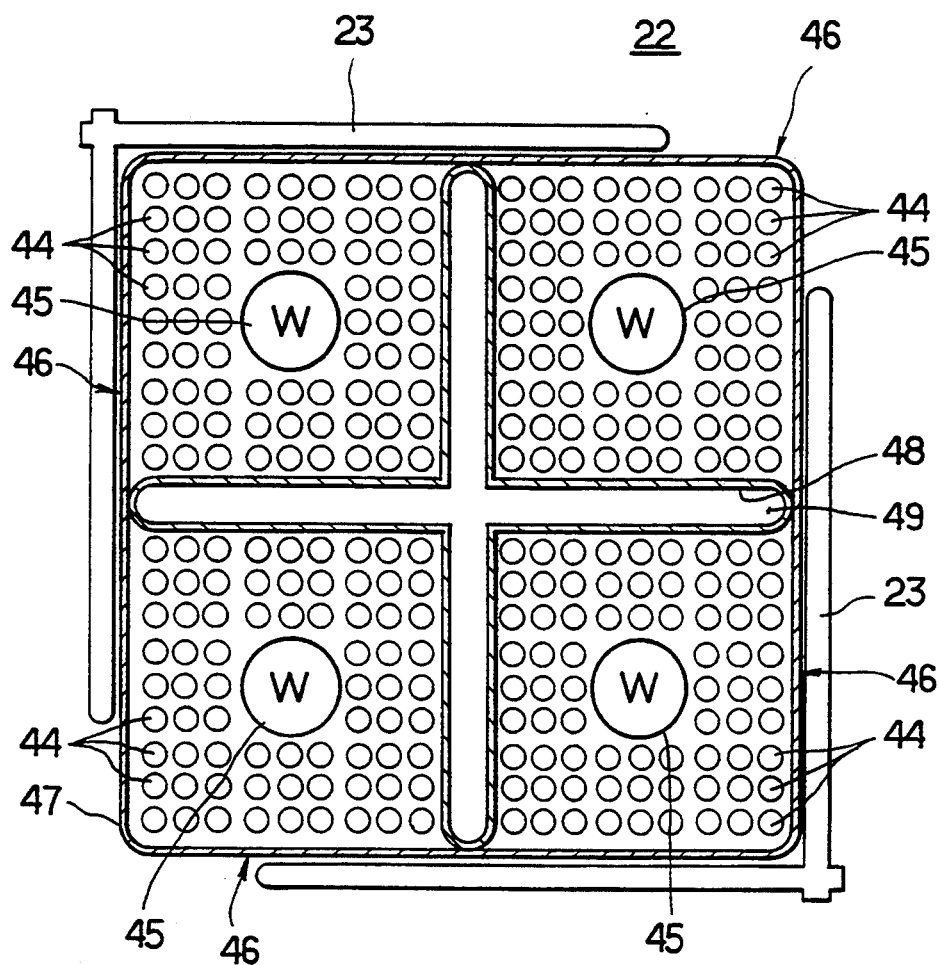
FIG. 8 shows a cross section of one example of a fuel assembly in an enlarged scale.

FIG. 8 shows a cross section of one example of a fuel assembly 22, utilized for the core 21, having short length and large size, and it is a matter of natural course that the present invention is not limited to the fuel assembly 22 of FIG. 8 and other large-sized fuel assemblies may be utilized.

Referring to FIG. 8, the fuel assembly 22 is composed of four fuel assembly sections 46 in a 2-row×2-line, each being composed of a plurality of fuel rods 44 in lattice arrangement of 9-row×9-line and a water rod 45 arranged centrally of the fuel assembly section 46. The entire structure of the fuel assembly 22 is composed of the four fuel assembly sections 46 and is surrounded by a large-sized channel box 47. These four fuel assembly sections 46 are arranged with a cross-shaped space between them, in which a large-sized cross-shape water rod 48 is inserted. The large-sized cross-shape water rod 48 acts in some ways as a channel box disposed inside the respective fuel assembly sections 46 for mutually partitioning the respective sections 46.

The inside of the large water rod 48 forms a non-boiling water area 49, and the location of such non-boiling water area 49 makes small thermal neutron diffusion between the fuel assembly sections 46 and reduces an influence of the control rod 23 to the sections 46 with respect to the control rods 23.

Figure 9:
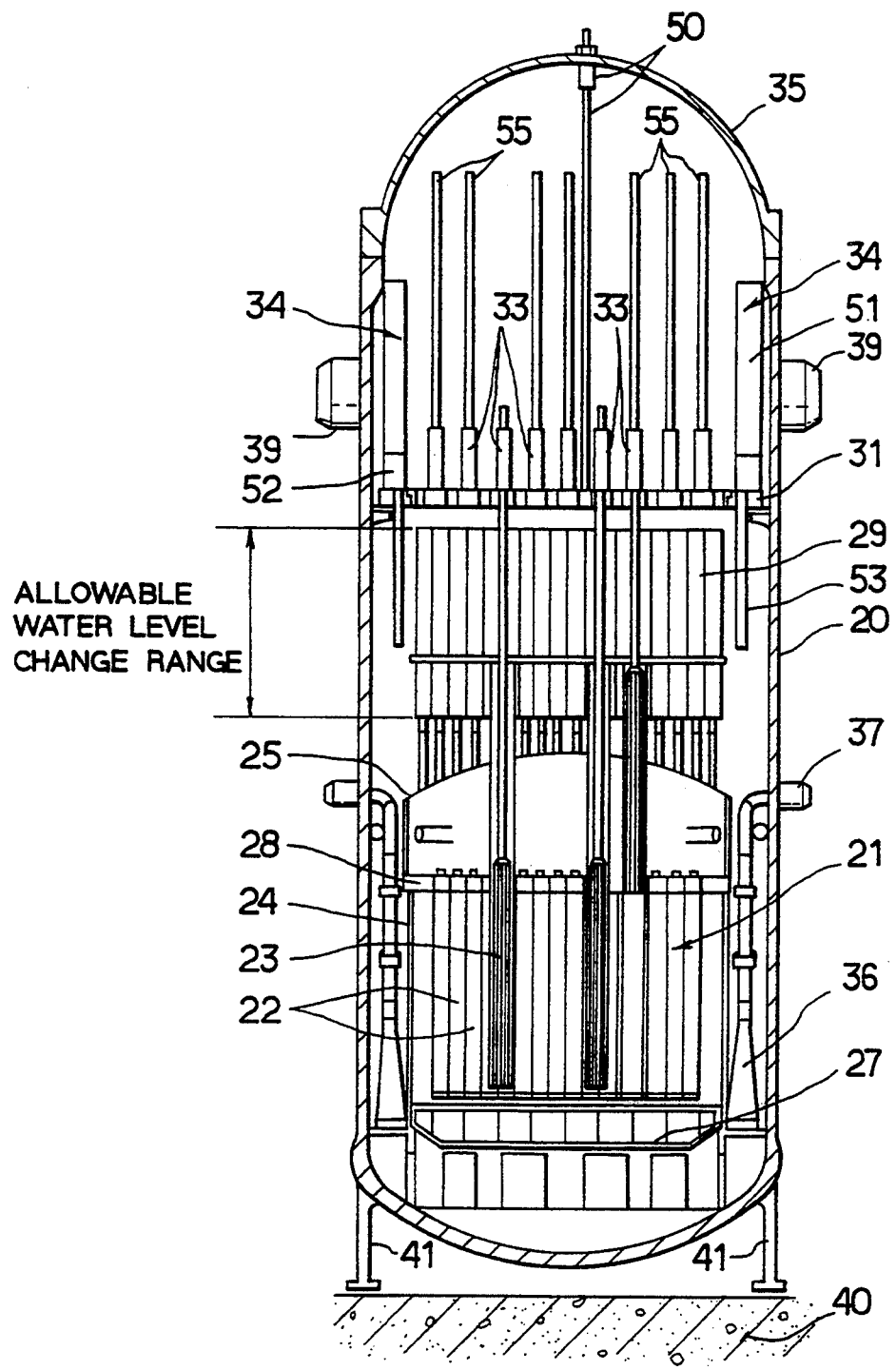
FIG. 9 is an elevational view for the explanatory of an allowable range of a water level change in a reactor pressure vessel.

FIG. 9 is an elevational view for explaining an allowable range of the water level change in the reactor pressure vessel 20, and as is apparent from FIG. 9, according to the present invention, a space for locating the separators 29 each having a long length above the core 21 can be ensured because the core 21 is positioned at a portion lower than the location of the core in the conventional arrangement. Accordingly, the allowable range of the water level change can be made large along the entire vertical length of the separator 29.

FIG. 10 is a partial sectional view of the thin annular drier means 34 shown in FIG. 1, and the drier means 34 comprises a plurality of drier elements 51, a drain receiving vessel 52 disposed below the drier elements 51 and drain tubes 53 extending downward from the drain receiving vessel 52. An area of the thin annular drier means 34 through which the steam passes is designed so as to have a height higher by 1.7 times than that of the conventional rectangular flat type drier 8 of FIG. 8 so that the area is substantially equal to 6 times of the drier 8. The drier elements are formed by a punched metal plate provided with a number of punched holes 51a for protecting the drier elements 51 from colliding with machineries during the periodical inspection.

Figure 11:
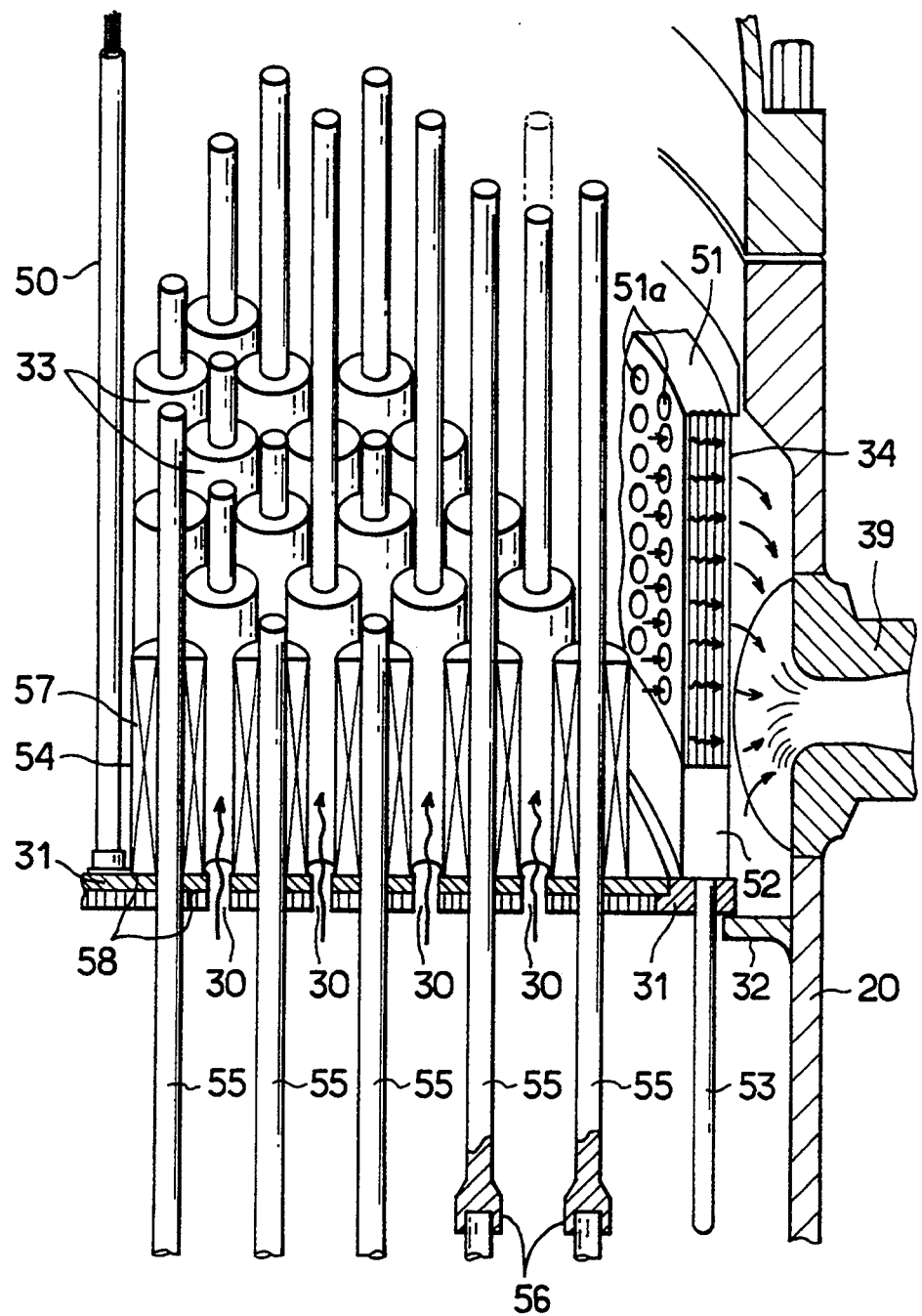
FIG. 11 is a schematic view of an upper control rod driving mechanism shown in FIG. 1.

FIG. 11 is a schematic view of the upper control rod driving mechanism 33, shown in FIG. 1 and in FIG. 11. Coils operating in a steam atmosphere are accommodated in pressure proof vessels 54 made of steel to thereby prevent moisture content from invading. The upper control rod driving mechanism 33 is mounted on the control rod driving mechanism fixing pedestal 31, and in the periodical inspection, the mechanism 33 can be entirely withdrawn outside the core by a suitable handling machine.

The control rod driving mechanism fixing pedestal 31 is formed with steam passing holes 30 attaining a rectifying function of the steam directing to the annular drier means 34. The upper control rod driving mechanism 33 includes control rod driving shafts 55 extending vertically and a magnet coupling 56 is mounted on the way of each of the control rod driving shafts 56 for separating it at that portion in the periodical inspection time or at any accident of the control rod driving mechanism 33. Lead wires of electromagnetic coils 57 of the upper control rod driving mechanism 33 are formed as MI (metal insulated) cables 58 effected with metal coating ceramics insulation and the MI cables 58 extends externally of the core through cable protection tubes 50. An electromagnetic motor may be utilized for the electromagnetic coils 57, but in both uses, it is necessary for these elements to be composed as a high temperature sealed structure. Since the upper control rod driving mechanism 33 is mounted on the control rod driving mechanism fixing pedestal 31 formed with a plurality of steam passing holes 30, these members 33 and 30 can be entirely taken out of the core at the time of the periodical inspection.

Figure 12:
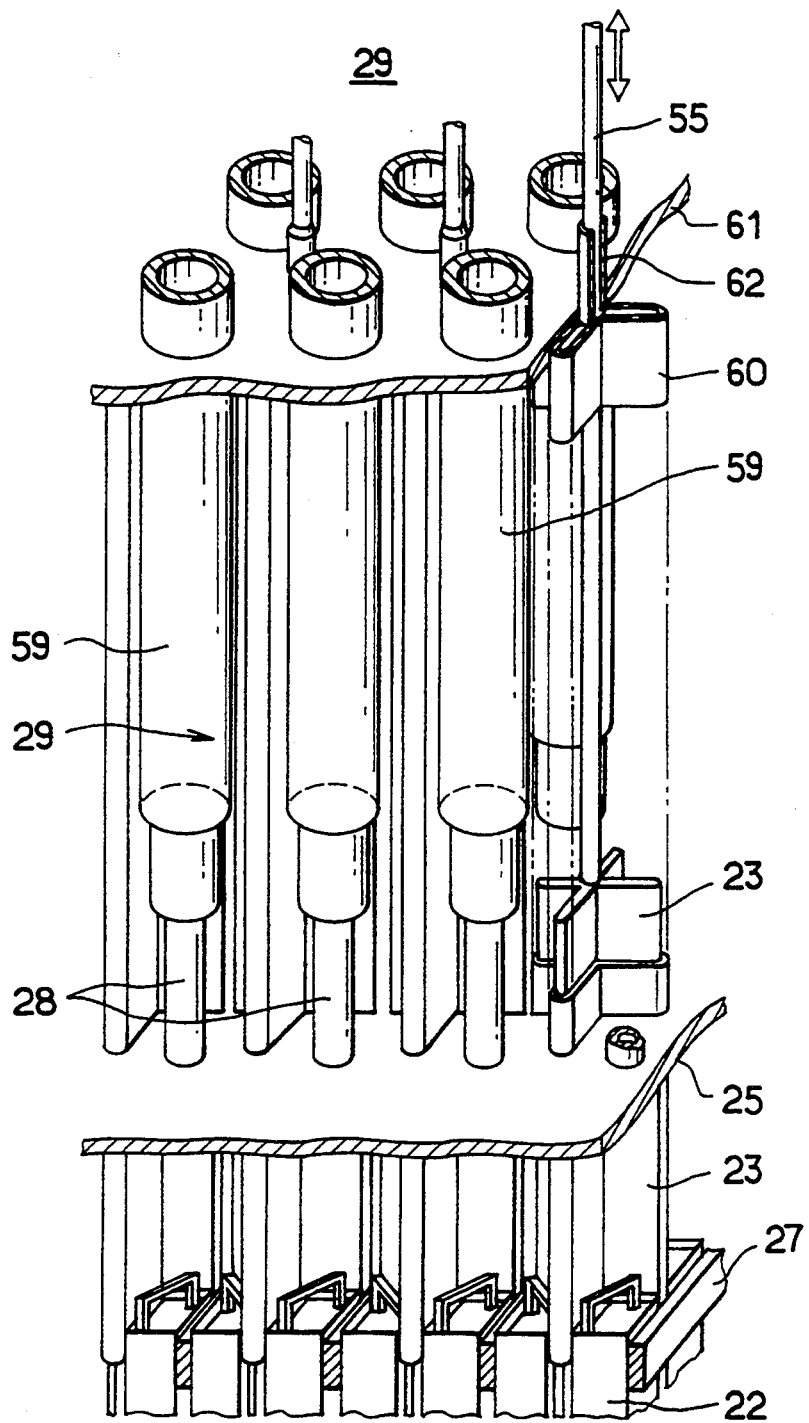
FIG. 12 is a perspective view showing separators partially shown in FIG. 1.

FIG. 12 is a perspective view showing the separators 29 each having a vertical long length and formed integrally with the control rod guide tube shown in FIG. 1. The separator 29 comprises cylindrical separator bodies 59 standing from the shroud head 25, cross-shaped control rod guide tubes 60 and the separator supporting plate 61. A labyrinth 62 is provided for the penetrating portion of the control rod driving shaft 55 above the cross-shaped control rod guide tube 60 for preventing the water coolant from rising upward.

Further, it is to be noted that the core shown in FIG. 12 at the lower portion therein represents another embodiment of the present invention and shows a case of the application of the present invention to the conventional core, and the cross-shaped control rod guide tube is inserted into a central space between four adjacent fuel assemblies. An example of a large-sized T-shape lattice core will be shown in FIG. 14.

Figure 13:
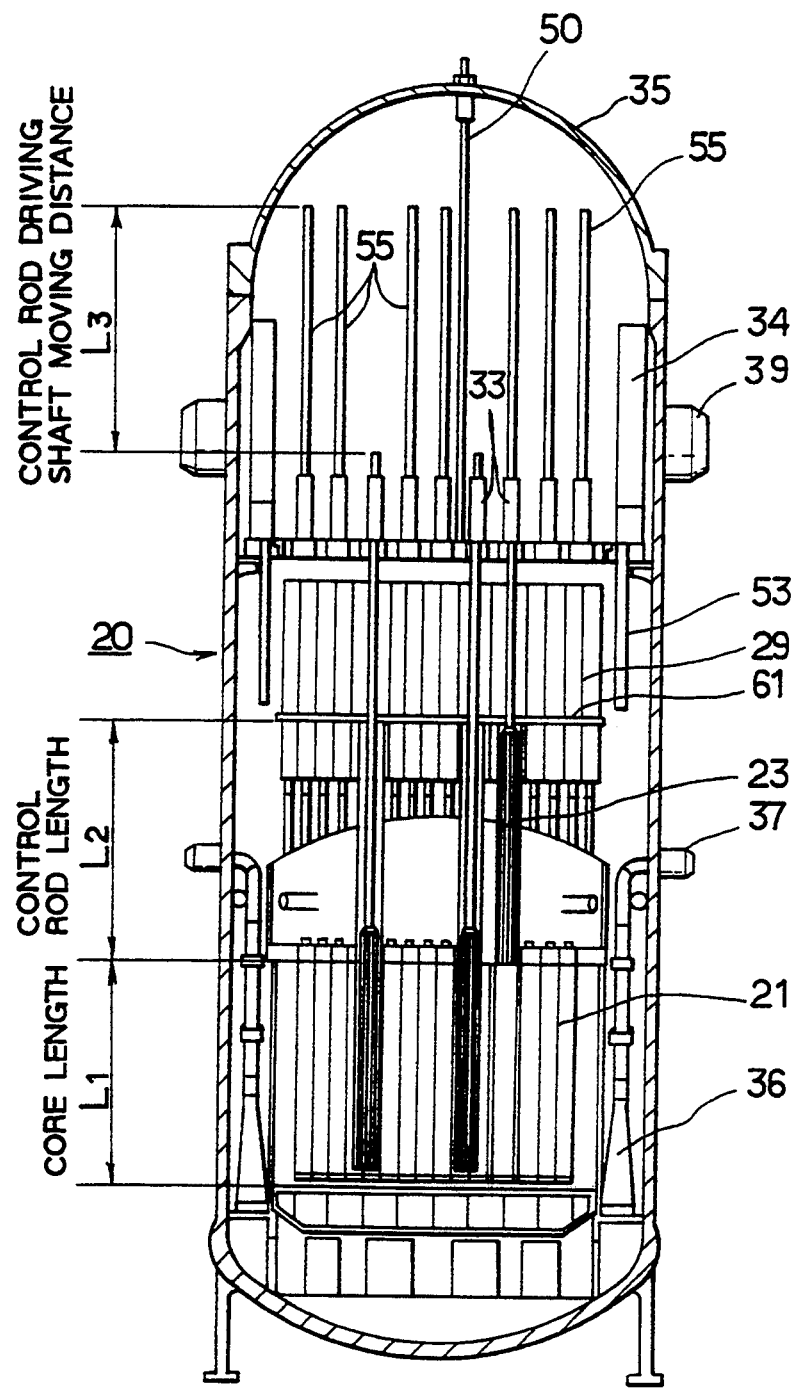
FIG. 13 is an elevational view for showing an axial dimensions of respective members or elements disposed in the rector pressure vessel of FIG. 1.

FIG. 13 is an elevational section for showing axial dimensions of the respective members or elements disposed in the reactor pressure vessel 20 shown in FIG. 1. In FIG. 13, the longitudinal lengths L1, L2 and L3 of the core 21, the control rod 23 and the control rod driving shaft 55 are made approximately equal to each other, so that when the length of the core 21 is shortened by a length of X, the entire length of the reactor pressure vessel 20 is made shortened by the length of 3X. Namely, the vertical length, i.e. height, of the reactor pressure vessel 20 and, hence, the reactor building, can be shortened by three times by shortening the length of the core 21.

FIG. 14 is a perspective view for showing a state in which the control rod 23 inserted between the fuel assemblies 22 in the large-sized T-shape lattice core 21 is withdrawn upwardly by some extent. In FIG. 14, the cross-shaped guide pads 63 and flat plate-like guide pads 63a shown in FIG. 5 are fixed to the longitudinal side surfaces of the large-sized channel box 47 in which the fuel rods are accommodated.

The control rod 23 has an upper portion to which are formed coupling grooves 64 to which the control rod driving shaft 65 is mounted. The control rod 23 has blade portions 65 in a comb shape extending downward from the cross-shaped base portion 23a. Each of the blade portions 65 has a cluster structure to be inserted between a slender gap 66 between the cross-shaped guide pad 63 and the flat plate-like guide pad 63a. The control rod 23 is mounted or dismounted through the gaps 66 positioned to the outer sides of the channel box 47 as guide grooves.

FIG. 15 is a perspective view of one jet pump 36 shown in FIG. 1. The jet pump 36 has a two staged structure (multi-nozzle structure) having a first stage nozzle 67 and a second stage nozzle 68 for obtaining a high flow magnification ratio (M ratio). In FIG. 15, reference numeral 69 denotes a first stage throat, 70 is a second stage throat and 71 is a diffuser connected to the second stage throat.

Figure 16:
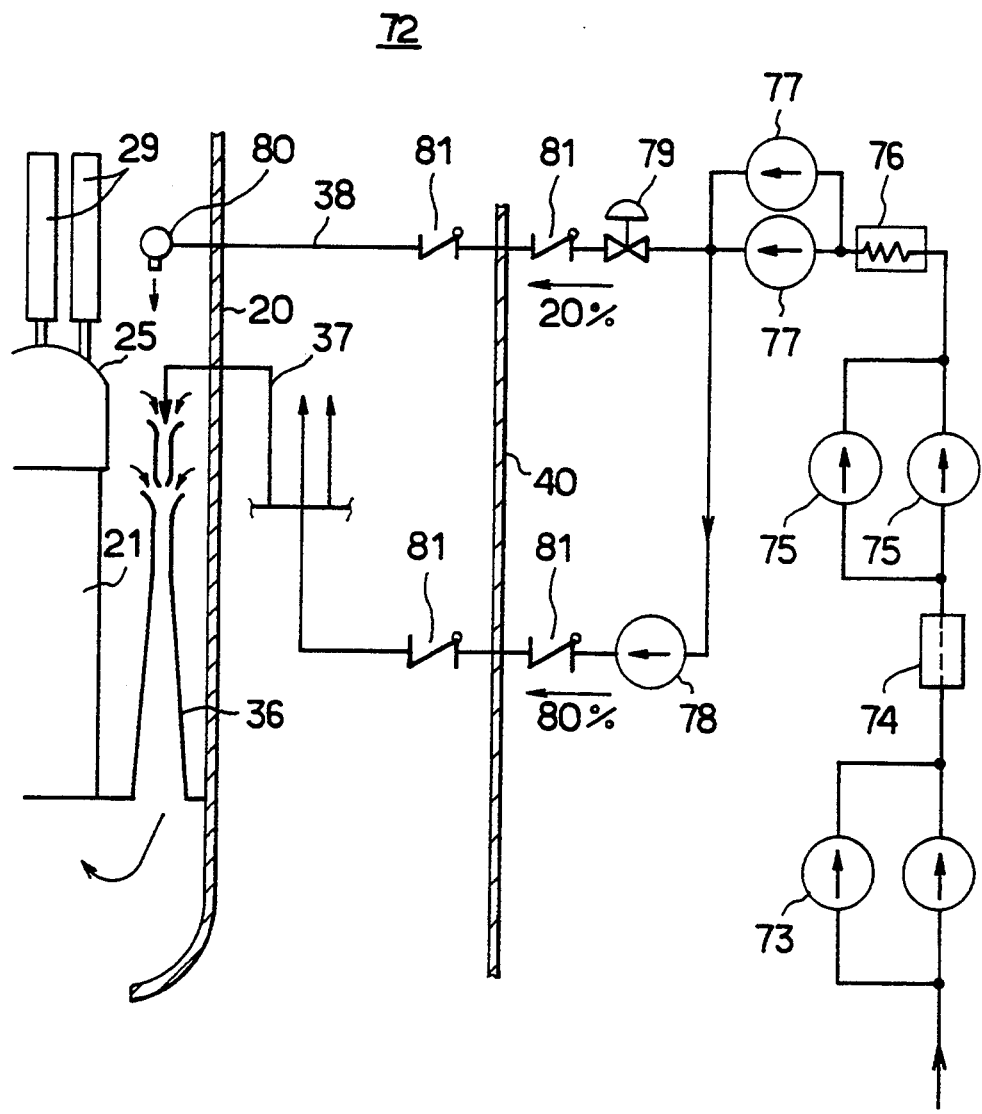
FIG. 16 is a system diagram for a system for driving the jet pump of FIG. 15.

FIG. 16 is a system diagram of a supply water driving jet pump system 72 utilizing the jet pump 36 of FIG. 15. The system 72 is composed of a low pressure condensate pump 73, a condensate desalting filter 74, a high pressure condensate pump 75, a supply water heater 76, supply water pump chamber 77, a jet pump driving pump 78 and the jet pump 36.

The water level in the reactor pressure vessel 20 is adjusted to a predetermined level by controlling, by means of a water level control valve 79, a flow rate of the water to be supplied to a supply water sparger 80 for controlling the water level. A check valve 81 is provided for the supply water system in consideration of an accidental pump trip.

Figure 17:
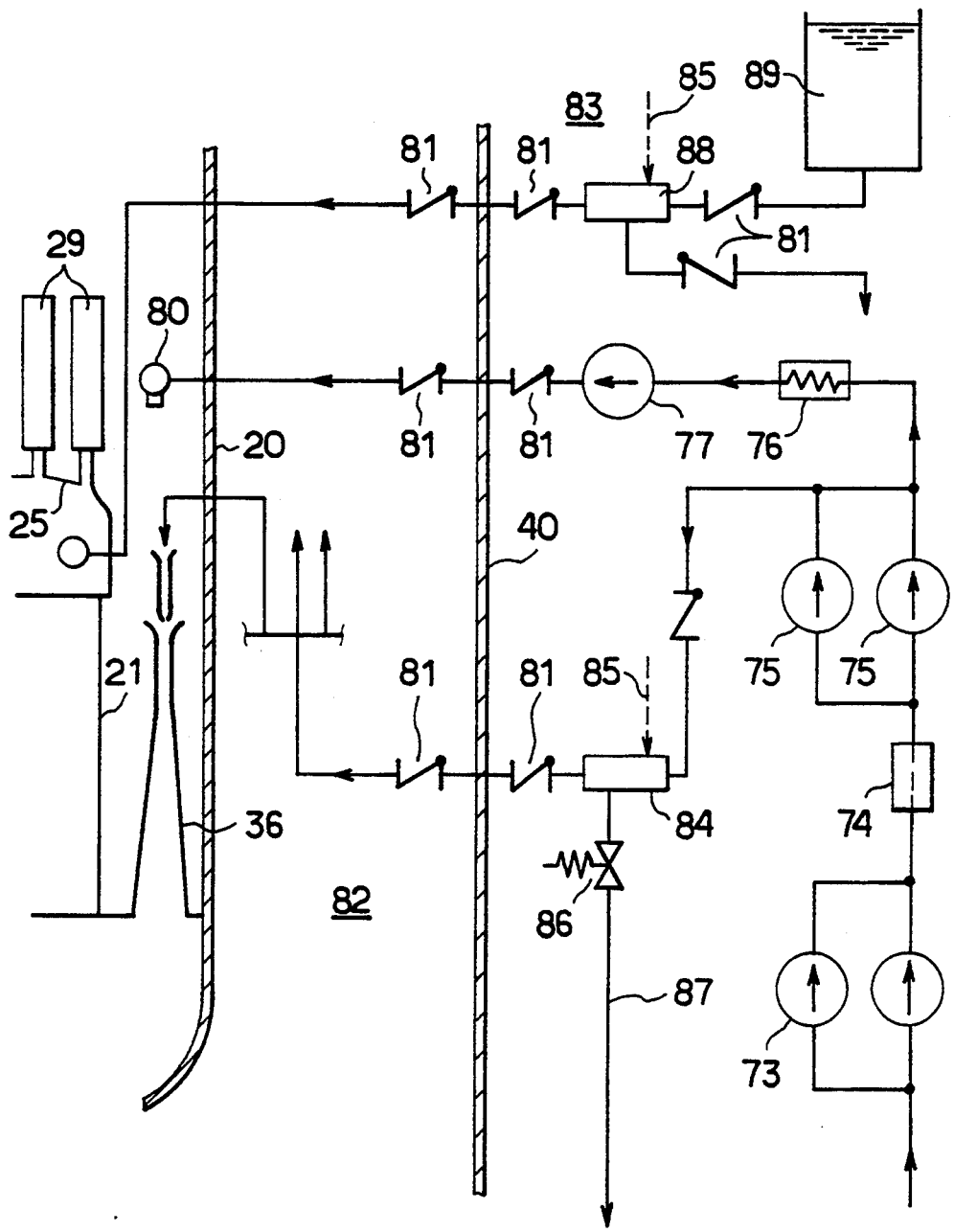
FIG. 17 is a system diagram of a steam injector driving jet pump system and a high pressure water supply system.

FIG. 17 is a system diagram showing a system including a steam injector driving jet pump system 82 and a high pressure water supply system 83. The steam injector driving jet pump system 72 is a system in which a recirculation steam injector 84 is substituted for the jet pump driving pump 78 in the supply water jet pump system 72 of FIG. 16. The recirculation steam injector 84 is operated by a discharge water from the high pressure condensate pump 75 and a steam 85 for driving the steam injector extracted from the main steam tube or high pressure stage of a main turbine.

At the operation start time, an overflow water is discharged to a drain tube 87 through a start escape valve 86. The water supply to the recirculation steam injector 84 is performed on an upstream side of the supply water heater 76 because the recirculation steam injector 84 is itself provided with a function of the supply water heater 76.

While, the steam injector high pressure water supply system 83 is operated in the use of the high pressure supply water injector 88 by a supply water from a condensate storage tank 89 and the steam 85 extracted from the main steam tube or high pressure stage of the main turbine. The steam injector high pressure water supply system 83 is operated as reactor core isolation cooling (RCIC) system at a time of a trip or isolation of the reactor and also operated as an emergency core cooling system (ECCS) at a time of loss of coolant accident (LOCA).

The steam injectors 84 and 88 are not equipped with any movable portions therein and hence are kinds of stationary type fluid pumps having an extremely compact structure. Furthermore, these steam injectors 84 and 88 do not require an AC power source for driving and an emergency diesel generator at the operation period thereof, thus being advantageous when applied to a reactor power plant. The steam injector high pressure supply water system is operated by a pool, as a water source, inside or outside the reactor containment vessel.

Figure 18:
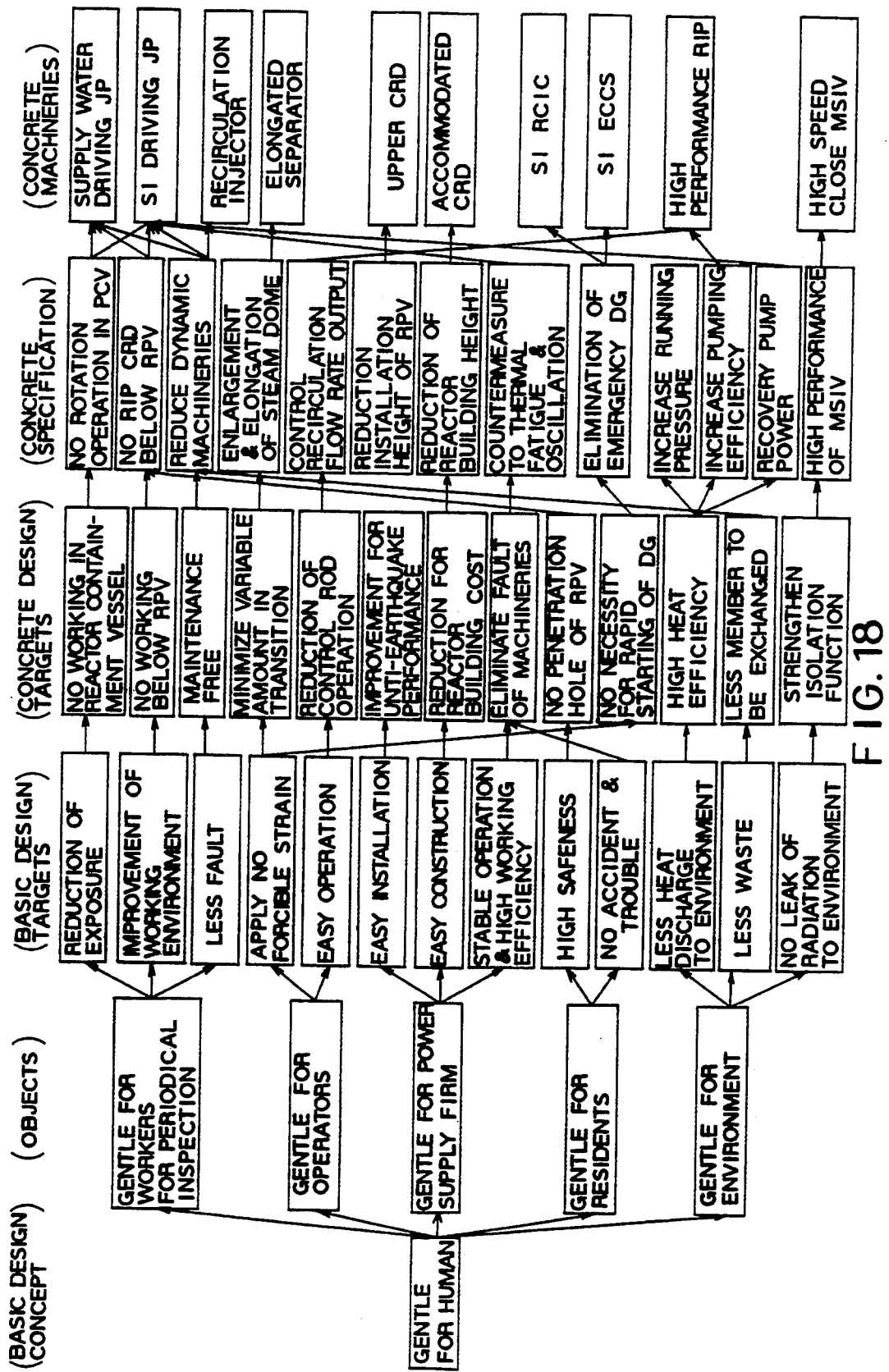
FIG. 18 is a block showing basic design objectives and conceptions for achieving the functions of the present invention.

FIG. 18 is a block diagram showing that actual equipments and machineries such as various kinds of system and incore assemblies arranged in the boiling water reactor are selected from the basic design concept of "Gentle For Worker" through design objectives. From this block, diagram it will be apparent that these equipments and machineries are selected remarkably in view of the concept of "Gentle For Worker" with respect to the workers for the periodical inspections, operators of a reactor, power supply firms, residents, environment and etc. In this block, the abbreviations PCV, RPV, DG, MSIV, JP, SI, CRD, RCIC, ECCS and RIP denote a reactor containment vessel, a reactor pressure vessel, an emergency deasel generator, a main steam isolation valve, a jet pump, a steam injector, a control rod driving mechanism, a reactor core isolation cooling system, an emergency core cooling system and internal pump, respectively.

Figure 19:
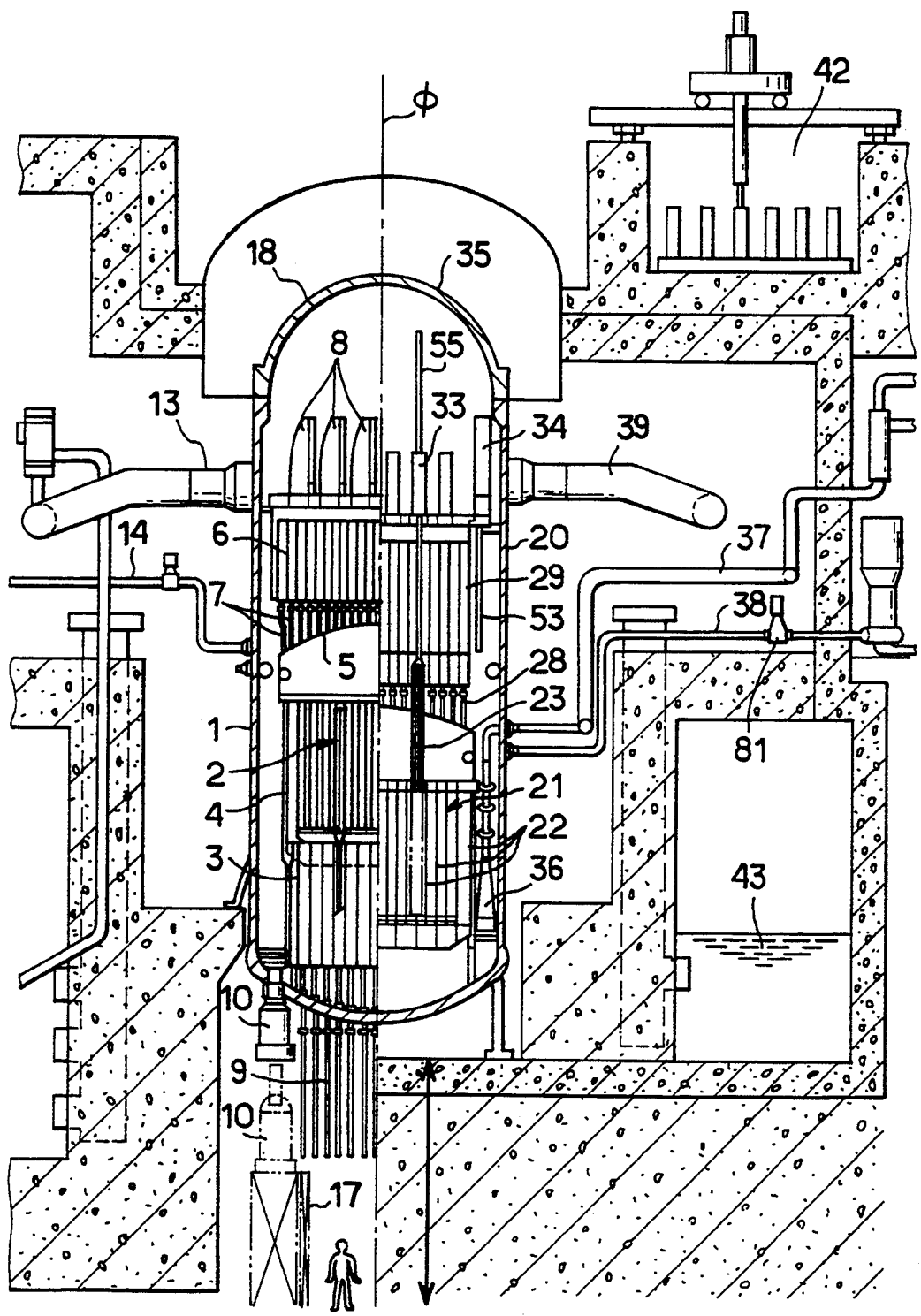
FIG. 19 is an elevational view showing reactor structure of the present invention and the conventional reactor structure for comparison.

FIG. 19 is an elevational view of a reactor for comparison having a right half representing the structure according to the present invention and a left half representing a conventional structure with a chain and dot line Φ being the center line. In the right half structure, the control rod driving mechanism is not disposed below the reactor pressure vessel 20, so that the height of the reactor building can be reduced by an amount of, about 10 m, shown with a large arrow, corresponding to a height of the control rod driving mechanism handling machine 17 in the conventional structure of the left half.

Furthermore, according to the structure of the present invention, since no duct or machinery penetrating the bottom of the reactor pressure vessel 20 exists, it is not necessary for the workers or operators to perform the removal or inspection of the machineries at a portion below the reactor pressure vessel for maintenace, thus being advantageous as "Gentle For Worker".

Still furthermore, the reactor core 21 according to the structure of the present invention is positioned at a portion lower than that 2 in the conventional structure, so that the space for arranging machineries such as separators 29 above the core 21 can be ensured, whereby the separators having relatively long lengths can be disposed, thus realizing a reactor having wide allowance range with respect to the water level change in the core.

What is claimed is:

1. A boiling water reactor comprising:
   a reactor pressure vessel accommodated in a reactor containment vessel in a vertical fashion;
   a core disposed at a low portion in the reactor pressure vessel, said core being composed of a plurality of fuel assemblies arranged with spaces from each other;
   a plurality of control rods to be inserted from an upper side of the core into the spaces between the fuel assemblies and withdrawn therefrom upwardly;
   a shroud surrounding the fuel assemblies so as to define the core and having an upper end opening;
   a shroud head which closes the upper end opening of the shroud and through which said control rods are inserted or withdrawn;
   a separator means standing upward from the shroud head to carry out gas-water separation of steam generated from the core;
   a fixing pedestal disposed above the separator means and provided with a steam flow hole through which steam separated by the separator means passes;
   a control rod driving mechanism located within the reactor pressure vessel mounted on the fixing pedestal and adapted to drive the control rods;
   a drier means arranged along an upper inner wall surface of the reactor pressure vessel; and
   a jet pump means disposed in a space between an outer surface of the shroud and an inner wall surface of the reactor pressure vessel.

2. A boiling water reactor according to claim 1, wherein said drier means comprises a plurality of drier elements arranged annularly along the upper inner wall surface of the reactor pressure vessel, drain receiving vessels disposed at lower end portions of the drier elements and drain tubes extending downward from the drain receiving vessels.

3. A boiling water reactor according to claim 2, wherein each of said drier element is composed of a metal plate formed with a number of punched holes.

4. A boiling water reactor according to claim 1, wherein said reactor pressure vessel has an upper end opening closed by a cover to which are provided a plurality of cable protection tubes through each of which a plurality of cables for measurement in a bundle extend outward from an inside of the reactor pressure vessel.

5. A boiling water reactor according to claim 1, wherein each of said control rods is provided with a magnet coupling on the way of the control rod so as to separate the control rod at a portion at which the magnet coupling is mounted.

6. A boiling water reactor according to claim 1, wherein said control rod driving mechanism is provided with a drive means composed of electromagnetic coils.

7. A boiling water reactor according to claim 6, wherein said electromagnetic coils are formed as metal insulated cables to which metal coating ceramics insulation is effected.

8. A boiling water reactor according to claim 1, wherein said control rod driving mechanism is provided with a drive means composed of an electromagnetically driven motor.

9. A boiling water reactor according to claim 1, wherein said separator means comprises a plurality of cylindrical bodies standing upward from the shroud head, a plurality of cross-shaped control rod guide tubes to be inserted into a space between adjacent fuel assemblies and a support plate for supporting the cylindrical bodies standing upward vertical attitude.

10. A boiling water reactor according to claim 9, wherein each of said cross-shaped control rod guide tubes is formed with a portion through which a control rod driving shaft penetrates and to which a labyrinth is formed to prevent a coolant from rising.

11. A boiling water reactor according to claim 1, wherein each of said control rods has a vertical length substantially equal to a vertical length of the core and a vertically moving length of a control rod driving shaft is substantially equal to the vertical length of the core.

12. A boiling water reactor according to claim 1, wherein said jet pump means comprises a plurality of jet pumps arranged with equal spaces from each other and annularly along the inner wall surface of the reactor pressure vessel.

13. A boiling water reactor according to claim 12, wherein each of said jet pumps comprises first and second stage nozzles, first and second stage throats and a diffuser connected to the second stage throat.

14. A boiling water reactor according to claim 12, wherein said jet pump means is driven by a plurality of jet pump driving pumps.

15. A boiling water reactor according to claim 12, wherein said jet pump means is driven by a plurality of steam injectors.

16. A boiling water reactor according to claim 1, wherein said jet pump means is operated so that a flow rate ratio of a driving water with respect to a driven water is at least more than 6.

17. A boiling water reactor according to claim 1, wherein the control rod drive mechanism is removed together with the fixing pedestal out of the reactor pressure vessel.

18. A boiling water reactor according to claim 1, wherein each of the fuel assemblies has a longitudinal length longer than twice a conventional fuel assembly.

19. A boiling water reactor according to claim 1, wherein the control rods have a cross-shaped cluster structure.

20. A boiling water reactor according to claim 1, wherein a channel box is formed with vertical grooves along which the control rods move.

* * * * *

UNITED STATES PATENT AND TRADEMARK OFFICE
CERTIFICATE OF CORRECTION

PATENT NO. : 5,392,326
DATED : February 21, 1995
INVENTOR(S) : Tadashi NARABAYASHI, et al.

It is certified that error appears in the above-indentified patent and that said Letters Patent is hereby corrected as shown below:

On the title page, Item [75], the twelfth inventor's name is spelled incorrectly. It should read:

--Iwao Ohshima--

Signed and Sealed this

Ninth Day of May, 1995

Attest:

BRUCE LEHMAN

*Attesting Officer*          *Commissioner of Patents and Trademarks*